(12) United States Patent
Bruns et al.

(10) Patent No.: US 10,116,604 B2
(45) Date of Patent: *Oct. 30, 2018

(54) ANIMATED DELIVERY OF ELECTRONIC MESSAGES

(71) Applicants: Miroslawa Bruns, Laguna Niguel, CA (US); Michael M. Ahmadshahi, Laguna Niguel, CA (US)

(72) Inventors: Miroslawa Bruns, Laguna Niguel, CA (US); Michael M. Ahmadshahi, Laguna Niguel, CA (US)

(73) Assignee: MITII, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,730

(22) Filed: Apr. 8, 2017

(65) Prior Publication Data
US 2017/0230321 A1 Aug. 10, 2017

Related U.S. Application Data

(63) Continuation-in-part of application No. 15/184,863, filed on Jun. 16, 2016, now Pat. No. 9,667,574, which is a continuation of application No. 14/448,206, filed on Jul. 31, 2014, now Pat. No. 9,397,972.

(60) Provisional application No. 61/931,240, filed on Jan. 24, 2014.

(51) Int. Cl.
| | |
|---|---|
| *G06F 15/16* | (2006.01) |
| *H04L 12/58* | (2006.01) |
| *G10L 13/04* | (2013.01) |
| *G06T 13/80* | (2011.01) |
| *G10L 13/033* | (2013.01) |

(52) U.S. Cl.
CPC ............. *H04L 51/10* (2013.01); *G06T 13/80* (2013.01); *G10L 13/043* (2013.01); *H04L 51/066* (2013.01); *G06T 2213/12* (2013.01); *G10L 13/033* (2013.01)

(58) Field of Classification Search
CPC ... G06T 13/80; G06T 2213/12; G10L 13/033; G10L 13/043; H04L 51/10
See application file for complete search history.

(56) References Cited

U.S. PATENT DOCUMENTS

| | | | |
|---|---|---|---|
| 7,472,353 B1 * | 12/2008 | Wolff | G11B 27/031 707/999.01 |
| 7,496,527 B2 | 2/2009 | Silverstein et al. | |
| 8,117,550 B1 | 2/2012 | Izdepski et al. | |
| 8,217,800 B2 | 7/2012 | Vander Veen et al. | |

(Continued)

*Primary Examiner* — Mohamed A Wasel
(74) *Attorney, Agent, or Firm* — Michael M. Ahmadshahi

(57) ABSTRACT

An electronic message is transformed into moving images uttering the content of the electronic message. Methods of the present invention may be implemented on devices such as smart phones to enable users to compose text and select an animation character which may include cartoons, persons, animals, or avatars. The recipient is presented with an animation or video of the animation character with a voice that speaks the words of the text. The user may further select and include a catch-phrase associated with the character. The user may further select a background music identifier and a background music associated with the background music identifier is played back while the animated text is being presented. The user may further select a type of animation and the animation character will be animated according to the type of animation.

20 Claims, 14 Drawing Sheets

(56) References Cited

U.S. PATENT DOCUMENTS

| | | |
|---|---|---|
| 8,354,937 B2 | 1/2013 | Vander Veen et al. |
| 8,428,551 B1 | 4/2013 | Peden et al. |
| 8,473,111 B1 | 6/2013 | Shankar et al. |
| 8,502,825 B2 | 8/2013 | Zalewski et al. |
| 8,508,379 B2 | 8/2013 | Vander Veen et al. |
| 8,725,581 B2 | 5/2014 | Breed et al. |
| 2001/0056470 A1* | 12/2001 | Ishitani ............... H04L 51/22 709/206 |
| 2003/0222874 A1* | 12/2003 | Kong ............... H04M 1/72547 345/473 |
| 2004/0034690 A1 | 2/2004 | Schmitz |
| 2004/0093281 A1 | 5/2004 | Silverstein et al. |
| 2007/0003029 A1 | 1/2007 | Vesterinen |
| 2008/0034044 A1* | 2/2008 | Bhakta ............... G06Q 10/00 709/206 |
| 2008/0287151 A1 | 11/2008 | Fjelstad et al. |
| 2009/0055187 A1 | 2/2009 | Leventhal et al. |
| 2009/0221372 A1 | 9/2009 | Casey et al. |
| 2010/0141662 A1* | 6/2010 | Storey ............... G06T 13/40 345/473 |
| 2010/0201478 A1 | 8/2010 | Veen et al. |
| 2011/0015939 A1 | 1/2011 | Lara Gonzalez |
| 2011/0093272 A1* | 4/2011 | Isobe ............... G10L 13/10 704/258 |
| 2011/0159842 A1 | 6/2011 | Vander Veen et al. |
| 2011/0270707 A1 | 11/2011 | Breed et al. |
| 2012/0064921 A1 | 3/2012 | Hernoud et al. |
| 2012/0244840 A1 | 9/2012 | Vander Veen et al. |
| 2013/0259313 A1 | 10/2013 | Breed et al. |
| 2013/0346560 A1 | 12/2013 | Macchietti et al. |
| 2014/0082520 A1 | 3/2014 | Mamoun |
| 2014/0129650 A1* | 5/2014 | Coatta ............... H04L 51/10 709/206 |

\* cited by examiner

ANIMATED DELIVERY OF ELECTRONIC MESSAGES

CROSS REFERENCE TO RELATED APPLICATIONS

The present patent application is a continuation-in-part of a co-pending non-provisional patent application entitled "ANIMATED DELIVERY OF ELECTRONIC MESSAGES," filed Jun. 16, 2016, as U.S. patent application Ser. No. 15/184,863 by the same inventor(s), which in, turn, is a continuation of a non provisional patent application entitled "ANIMATED DELIVERY OF ELECTRONIC MESSAGES," filed Jul. 31, 2014, as U.S. patent application Ser. No. 14/448,206, now U.S. Pat. No. 9,397,972 by the same inventor(s), which in turn, was the formalization of a previously filed, expired provisional patent application entitled "ANIMATED DELIVERY OF ELECTRONIC MESSAGES," filed Jan. 24, 2014, as U.S. patent application Ser. No. 61/931,240 by the inventor(s) named in this application. This patent application claims the benefit of the filing date of the cited non-provisional and provisional patent applications according to the statutes and rules governing provisional and non-provisional patent applications, particularly 35 USC §§ 119, 120, 121, and 37 CFR § 1.78. The specification and drawings of the cited, provisional and non-provisional patent applications are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to methods of communication, including computer programs, user interface, devices, and network systems, where text is converted into a moving image with voice. In particular, the methods, which may be implemented on smart phones and/or computer network systems, allow the users to compose electronic messages and select an animation character, and the message is converted into voice and moving images of the animation character is displayed on a screen in motion uttering the message. Specifically, the electronic message is converted into speech using one of synthesized voice and actual voice of a voice impersonator of a well-known animation character. Furthermore, type of animation comprises one of happy type, sad type, dramatic type, dancing type, and exercising type.

BACKGROUND

The present invention discloses methods of communication using electronic messages such as texts or entails where the composer of the electronic message selects an animation character to present the message to the recipient in spoken words. The electronic message may be an instant message, personal, message, text message, e-mail, or voicemail. The animation character may be the image of oneself or a "selfie," a well-know human character like the actor Clint Eastwood, a cartoon character like Jerry the Mouse, an animal character like a cat or a dog, or an avatar character like the character in the movie Avatar. The text of the message is converted into speech. The image of the animation character is animated using computer animation or CGI. The recipient's device displays the moving images or video of the animation character and outputs the speech. The speech is synthesized and may be in any language.

A device such as a smart phone can be used to implement the methods. A user can utilize the device, which includes a processing unit and program code, to compose an electronic message and select an animation character. The device converts the text of the electronic message into speech. The device further generates moving images of the animation character. The speech and the moving images are transmitted via the device. For instance, the user selects a photograph of herself, inputs the phrase "you complete me," and the recipient of the electronic message is presented with moving images of the user uttering the words "you complete me." In a preferred embodiment, the speech is synthesized in such a way that is characteristic of the voice of the actress "Renee Zellweger" who uttered the phrase "you complete me" in the movie "Jerry Maguire."

In different embodiments, conversion of text to speech and generation of moving images can occur on different devices. The computer network system includes the sender's device, recipient's device, servers and communication network. Servers include dedicated computer systems and associated software for speech synthesization and animation of animation character, as specified herein. The communication network comprises at least one of the Internet, Wi-Fi, ground-based communication devices and software, routers, cables, interface software, air-based communication devices, satellites, and satellite transceivers. In one preferred embodiment, voice synthesization and image animation is performed by servers and transmitted to recipients' devices.

In a preferred embodiment, the recipient's device receives the sender's text and animation character and performs the operations of voice synthesization and animation generation. For instance, the sender inputs the text "love means never having to say you're sorry" and selects the character "Ryan O'Neal." The text and image (or in an alternative embodiment, an image identifier which identifies the image of Ryan O'Neal) is transmitted via the user's device through the communication network and are received by the recipient's device, such as an iPhone. The recipient's iPhone notifies the recipient, through badges, alerts, or banners, that the recipient has received an electronic message. An App, embodying this preferred embodiment, is activated and the recipient sees an animated Ryan O'Neal speaking the words "love means never having to say you're sorry." In a preferred embodiment, the catch-phrase "love means never having to say you're sorry" which was uttered by the actor Ryan O'Neal in the movie "Love Story" is selectable and it does not have to be inputted by the sender.

Speech synthesis is the artificial production of human speech. A computer system used for this purpose is called a speech synthesizer, and can be implemented in software or hardware products. A text-to-speech (TTS) system converts normal language text into speech; other systems render symbolic linguistic representations like phonetic transcriptions into speech.

Synthesized speech can be created by concatenating pieces of recorded speech that are stored in a database. Systems differ in the size of the stored speech units; a system that stores phones or diphones provides the largest output range, but may lack clarity. For specific usage domains, the storage of entire words or sentences allows for high-quality output. Alternatively, a synthesizer can incorporate a model of the vocal tract and other human voice characteristics to create a completely "synthetic" voice output.

The quality of a speech synthesizer is judged by its similarity to the human voice and by its ability to be understood. An intelligible text-to-speech program allows people with visual impairments or reading disabilities to listen to written works on a home computer. Many computer operating systems have included speech synthesizers since the early 1990s.

A text-to-speech system (or "engine") is composed of two parts: a front-end and a back-end. The front-end has two major tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output by the front-end. The back-end—often referred to as the synthesizer—then converts the symbolic linguistic representation into sound. In certain systems, this part includes the computation of the target prosody (pitch contour, phoneme durations), which is then imposed on the output speech.

The present invention implements these existing technologies (Text-to-Speech, or TTS systems) to synthesize the voice of the animation character. Synthesization of the animation character speech can be created by either concatenating pieces of recorded speech that are stored in a database, or by incorporating a model of the vocal tract and other animation character voice characteristics to create a completely synthetic voice output.

Computer animation or CGI animation is the process used for generating animated images by using computer graphics. The more general term computer-generated imagery encompasses both static scenes and dynamic images, while computer animation only refers to moving images. Modern computer animation usually uses 3D computer graphics, although 2D computer graphics are still used for stylistic, low bandwidth, and faster real-time renderings. Sometimes the target of the animation is the computer itself, but sometimes the target is another medium, such as film.

Computer animation is essentially a digital successor to the stop motion techniques used in traditional animation with 3D models and frame-by-frame animation of 2D illustrations. Computer generated animations are more controllable than other more physically based processes, such as constructing miniatures for effects shots or hiring extras for crowd scenes, and because it allows the creation of images that would not be feasible using any other technology. It can also allow a single graphic artist to produce such content without the use of actors, expensive set pieces, or props. To create the illusion of movement, an image is displayed on the computer monitor and repeatedly replaced by a new image that is similar to it, but advanced slightly in time (usually at a rate of 24 or 30 frames/second). This technique is identical to how the illusion of movement is achieved with television and motion pictures. For 3D animations, objects (models) are built on the computer monitor (modeled) and 3D figures are rigged with a virtual skeleton.

For 2D figure animations, separate objects (illustrations) and separate transparent layers are used, with or without a virtual skeleton. Then the limbs, eyes, mouth, clothes, etc. of the figure are moved by the animator on key frames. The differences in appearance between key frames are automatically calculated by the computer in a process known as tweening or morphing. Finally, the animation is rendered.

For 3D animations, all frames must be rendered after modeling is complete. For 2D vector animations, the rendering process is the key frame illustration process, while tweened frames are rendered as needed. For pre-recorded presentations, the rendered frames are transferred to a different format or medium such as film or digital video. The frames may also be rendered in real time as they are presented to the end-user audience. Low bandwidth animations transmitted via the Internet (e.g. 2D Flash, X3D) often use software on the end-users computer to render in real time as an alternative to streaming or pre-loaded high bandwidth animations.

The present invention implements these existing technologies (computer animation or CGI animation systems) to generate moving images of the animation character. Animation of the animation character can be in 2D or 3D which mimics the traditional frame-by-frame or stop-motion techniques, respectively.

In most 3D computer animation systems, an animator creates a simplified representation of a character's anatomy, analogous to a skeleton or stick figure. The position of each segment of the skeletal model is defined by animation variables, or Avars. In human and animal characters, many parts of the skeletal model correspond to actual bones, but skeletal animation is also used to animate other things, such as facial features (though other methods for facial animation exist). The character "Woody" in Toy Story, for example, uses 700 Avars, including 100 Avars in the face. The computer does not usually render the skeletal model directly (it is invisible), but uses the skeletal model to compute the exact position and orientation of the character, which is eventually rendered into an image. Thus by changing the values of Avars over time, the animator creates motion by making the character move from frame to frame.

There are several methods for generating the Avar values to obtain realistic motion. Traditionally, animators manipulate the Avars directly. Rather than set Avars for every frame, they usually set Avars at strategic points (frames) in time and let the computer interpolate or 'tween' between them a process called keyframing. Keyframing puts control in the hands of the animator, and has roots in hand-drawn traditional animation. Accordingly, the present invention may implement this technique to create and change the values of Avars over time to generate moving images of the animation character.

In contrast, a newer method called motion capture makes use of live action. When computer animation is driven by motion capture, a real performer acts out the scene as if they were the character to be animated. His or her motion is recorded to a computer using video cameras and markers, and that performance is then applied to the animated character. Accordingly, the present invention may implement the motion capture technique to generate moving images of the animation character.

Each method has its advantages, and as of 2007, games and films are using either or both of these methods in productions. Keyframe animation can produce motions that would be difficult or impossible to act out, while motion capture can reproduce the subtleties of a particular actor. For example, in the 2006 film Pirates of the Caribbean: Dead Man's Chest, actor Bill Nighy provided the performance for the character Davy Jones. Even though Nighy himself doesn't appear in the film, the movie benefited from his performance by recording the nuances of his body language, posture, facial expressions, etc. Thus motion capture is appropriate in situations where believable, realistic behavior and action is required, but the types of characters required exceed what can be done through conventional costuming.

3D computer animation combines 3D models of objects and programmed or hand "key Lamed" movement. Models are constructed out of geometrical vertices, faces, and edges in a 3D coordinate system. Objects are sculpted much like real clay or plaster, working from general forms to specific details with various sculpting tools. Unless a 3D model is intended to be a solid color, it must be painted with "textures" for realism. A bone/joint animation system is set up to deform the CGI model (e.g., to make a humanoid model walk). In a process called rigging, the virtual marionette is given various controllers and handles for controlling movement. Animation data can be created using motion capture, keyframing by a human animator, or a combination of the two. 3D models rigged for animation may contain thousands of control points—for example, the character "Woody" in Pixar's movie Toy Story, uses 700 specialized animation controllers. Rhythm and Hues Studios labored for two years to create Asian in the movie The Chronicles of Narnia: The Lion, the Witch and the Wardrobe which had about 1851 controllers, 742 in just the face alone. In the 2004 film The Day After Tomorrow, designers had to design forces of extreme weather with the help of video references and accurate meteorological facts. For the 2005 remake of King Kong, actor Andy Serkis was used to help designers pinpoint the gorilla's prime location in the shots and used his expressions to model "human" characteristics onto the creature. Serkis had earlier provided the voice and performance for Gollum in J. R. R. Tolkien's The Lord of the Rings trilogy. Accordingly, the present invention may implement 3D computer animation technique to generate moving images of the animation character.

Computer animation can be created with a computer and animation software. Some impressive animation can be achieved even with basic programs; however, the rendering can take a lot of time on an ordinary home computer. Because of this, video game animators tend to use low resolution, low polygon count renders, such that the graphics can be rendered in real time on a home computer. Photorealistic animation would be impractical in this context. Professional animators of movies, television, and video sequences on computer games make photorealistic animation with high detail. This level of quality for movie animation would take tens to hundreds of years to create on a home computer. Many powerful workstation computers are used instead. Graphics workstation computers use two to four processors, and thus are a lot more powerful than a home computer, and are specialized for rendering. A large number of workstations (known as a render farm) are networked together to effectively act as a giant computer. The result is a computer-animated movie that can be completed in about one to five years (this process is not composed solely of rendering, however). A workstation typically costs $2,000 to $16,000, with the more expensive stations being able to render much faster, due to the more technologically advanced hardware that they contain. Professionals also use digital movie cameras, motion capture or performance capture, bluescreens, film editing software, props, and other tools for movie animation. Accordingly, the present invention may utilize these types of animation software and hardware to generate moving images of the animation character.

The realistic modeling of human facial features is both one of the most challenging and sought after elements in computer-generated imagery. Computer facial animation is a highly complex field where models typically include a very large number of animation variables. Historically speaking, the first SIGGRAPH tutorials on State of the art in Facial Animation in 1989 and 1990 proved to be a turning point in the field by bringing together and consolidating multiple research elements, and sparked interest among a number of researchers. The Facial Action Coding System (with 46 action units such as "lip bite" or "squint") which had been developed in 1976 became a popular basis for many systems. As early as 2001 MPEG-4 included 68 Face Animation Parameters (FAPs) for lips, jaws, etc., and the field has made significant progress since then and the use of facial microexpression has increased. In some cases, an affective space such as the PAD emotional state model can be used to assign specific emotions to the faces of avatars. In this approach the PAD model is used as a high level emotional space, and the lower level space is the MPEG-4 Facial Animation Parameters (FAP). A mid-level Partial Expression Parameters (PEP) space is then used to in a two level structure: the PAD-PEP mapping and the PEP-FAP translation model. Accordingly, the present invention may incorporate these facial animation techniques in generating moving images of the animation character.

In 2D computer animation, moving objects are often referred to as "sprites." A sprite is an image that has a location associated with it. The location of the sprite is changed slightly, between each displayed frame, to make the sprite appear to move. Computer animation uses different techniques to produce animations. Most frequently, sophisticated mathematics is used to manipulate complex three-dimensional polygons, apply "textures", lighting and other effects to the polygons and finally rendering the complete image. A sophisticated graphical user interface may be used to create the animation and arrange its choreography. Another technique called constructive solid geometry defines objects by conducting Boolean operations on regular shapes, and has the advantage that animations may be accurately produced at any resolution. Accordingly, the present invention may incorporate these computer animation techniques to generate moving images of the animation character.

Computer-assisted animation is usually classed as two-dimensional (2D) animation. Creators drawings either hand drawn (pencil to paper) or interactively drawn (drawn on the computer) using different assisting appliances and are positioned into specific software packages. Within the software package the creator will place drawings into different key frames which fundamentally create an outline of the most important movements. The computer will then fill in all the "in-between frames" commonly known as Tweening. Computer assisted animation is basically using new technologies to cut down the time scale that traditional animation could take, but still having the elements of traditional drawings of characters or objects. Two examples of films using computer-assisted animation are Beauty and the Beast and Antz. Computer-generated animation is known as 3-dimensional (3D) animation. Creators will design an object or character with an X, Y and Z axis. Unlike the traditional way of animation no pencil to paper drawings creates the way computer generated animation works. The object or character created will then be taken into a software, key framing and tweening are also carried out in computer generated animation but are also a lot of techniques used that do not relate to traditional animation. Animators can break physical laws by using mathematical algorithms to cheat, mass, force and gravity rulings. Fundamentally, time scale and quality could be said to be a preferred way to produce animation as they are two major things that are enhanced by using computer generated animation. Another great aspect of CGA is the fact you can create a flock of creatures to act independently when created as a group. An animal's fur can be programmed to wave in the wind and lie flat when it rains instead of programming each strand of hair separately. Three examples of computer-generated animation movies are Toy Story, The Incredibles and Shrek. Accordingly, the present invention may incorporate computer-assisted and/or computer-generated animation techniques to generate moving images of the animation character.

Incorporating and applying these technologies to an electronic message can transform plane texts into interesting short films. The present invention seeks to provide methods for communication using electronic messages where users can use their creativity to enhance their contents. Images and videos have much greater impact than simple words. Transforming electronic messages according to the present invention is desirable.

Although various systems have been proposed which touch upon some aspects of the above problems, they do not provide solutions to the existing limitations in providing methods of communication for users to compose electronic messages and select a character where the message is converted into voice and the character is displayed on a screen in motion uttering the message. For example, Coatta et al., U.S. Pat. App. No. 20140129650, discloses: "a wireless communications system that allows a mobile phone, tablet or personal computer user the ability to initiate the sending of a text message or email whereby the sender is able to include photographs, graphs, pie charts and the like within the flow of the actual word by word telling or email writing process, without depending on the traditional necessary step to 'attach' the photograph." However, the disclosure does not provide methods where texts are transformed into moving characters, uttering the text.

Mamoun, U.S. Pat. App. No. 20140082520, discloses: "instant messaging applications of all forms, ranging from standard short-message-service (SMS) text messaging to basic multimedia messaging incorporating sounds and images, to myriad 'chat' applications, have become a staple form of communication for millions or billions of phone, computer and mobile device users. The following invention is composed of a set of claims that comprise a novel method and system for an enhanced, more expressive system of messaging that combines text and multimedia (audio, images and video) with a gesture-driven, animated interface especially suited for the newest generation of touch-sensitive mobile device screens. An additional set of claims extends the gesture-driven interface to include 'hands-free' spatial-gesture-recognizing-devices which can read and interpret physical hand and body gestures made in the environment adjacent to the device without actual physical contact, as well as adaptations for less-advanced traditional computers with keyboard and mouse." However, Mamoun does, not disclose methods where texts are transformed into moving images uttering the text.

According to the surveys, mobile use around the world has been increasing over the past years. While music, games, news and other factors all played a role in the growth, electronic messaging has turned out to be the bulk of what drove the spike in increased usage. The present invention offers a simple, yet efficient, alternative to existing technologies by incorporating methods of voice synthesization and image animation to transform texts into what might be called a very short film! It provides a platform where users may use their creativity to enhance the content of their electronic messages.

SUMMARY

The present invention discloses methods including computer programs, user interface, and computer network systems for composing and presenting electronic messages. In particular, the methods allow a user to compose an electronic message and associate an animation character with the message. The recipient of the message receives the massage and the message is presented through the animation character. As such, the message is transformed into a video of the animation character uttering the text.

In one aspect, a machine implemented method of communicating is disclosed wherein the method comprises composing an electronic message, via a first device having a processing unit and program code stored on a storage device of said first device, selecting a well-known animation character, via the first device, transmitting the electronic message, via the first device, transmitting the well-known animation character, via the first device, receiving the electronic message, via a sewer having a processing unit and program code stored on a storage device of said server, receiving the well-known animation character, via the server, converting the electronic message into speech using one of synthesized voice and actual voice of a voice impersonator of the well-known animation character, via the server, generating moving images of the well-known animation character, via the server, transmitting the speech, via the server, transmitting the moving images, via the server, receiving the speech, via a second device having a processing unit and program code stored on a storage device of said second device, receiving the moving images, via the second device, outputting the speech, via the second device, and displaying the moving images, via the second device.

Preferably, the method further comprises receiving a background-music identifier, via the second device, and outputting a background music according to the background-music identifier, via the second device.

Preferably, the method further comprises selecting a type of animation, via the first device, and wherein the step of generating moving images of the well-known animation character comprises generating moving images of the well-known animation character according to the type of animation. Preferably, the type of animation comprises one of happy type, sad type, dramatic type, dancing type, and exercising type.

In another aspect, a machine implemented method of communicating is disclosed wherein the method comprises receiving an electronic message, via a server having a processing unit and program code stored on a storage device of said server, receiving a well-known animation character, via the server converting the electronic message into speech using one of synthesized voice and actual voice of a voice impersonator of the well-known animation character, via the server, generating moving images of the well-known animation character, via the server, transmitting the speech, via the server, and transmitting the moving images, via the server.

Preferably, a non-transitory machine-readable storage medium, provides instructions that, when executed by a processing unit, causes the processing unit to perform communication operations according to any one of the above methods.

Preferably, a server has a processing unit and program code stored on a storage device of said server wherein said program code performs a method according to any of the above methods when executed by said processing unit.

Preferably, the electronic message is one of instant message, personal message, text message, e-mail, and voice-mail.

Preferably, the well-known animation character is one of human, animal, cartoon, and avatar.

Preferably, the step of converting the electronic message into speech comprises utilizing pre-recorded speech of a voice impersonator of the well-known animation character.

Preferably, the step of converting the electronic message into speech comprises synthesizing speech of a voice impersonator of the well-known animation character.

Preferably, the step of generating moving images of the well-known animation character comprises utilizing pre-animated images of the well-known animation character.

Preferably, the step of generating moving images of the well-known animation character comprises animating images of the well-known animation character.

Preferably, the electronic message comprises a catch-phrase associated with the well-known animation character.

Preferably, the method further comprises receiving a background-music identifier, via the server, and outputting a background music according to the background-music identifier, via the server.

Preferably, the method further comprises receiving a type of animation, via the server; and wherein the step of generating moving images of the well-known animation character comprises generating moving images of the well-known animation character according to the type of animation.

In another aspect, a computer network system for communication is disclosed wherein the system comprises a first device having a processing unit and program code stored on a storage device of said first device, said program code to perform a method when executed by said processing unit, said method, comprising composing an electronic message, selecting a well-known animation character, transmitting the electronic message, transmitting the well-known animation character, and a server having a processing unit and program code stored on a storage device of said server, said program code to perform a method when executed by said processing unit, said method, comprising receiving the electronic message, receiving the well-known animation character, converting the electronic message into speech using one of synthesized voice and actual voice of a voice impersonator of the well-known animation character, generating moving images of the well-known animation character, transmitting the speech, transmitting the moving images, and a second device having a processing unit and program code stored on a storage device of said second device, said program code to perform a method when executed by said processing unit, said method, comprising receiving the speech, receiving the moving images, outputting the speech, and displaying the moving images.

Preferably, the electronic message is one of instant message, personal message, text message, e-mail, and voice-mail.

Preferably, the well-known animation character is one of human, animal, cartoon, and avatar.

Preferably, the step of converting the electronic message into speech comprises utilizing pre-recorded speech of a voice impersonator of the well-known animation character.

DETAILED DESCRIPTION OF THE PRESENTLY PREFERRED EMBODIMENTS

Figure 1:
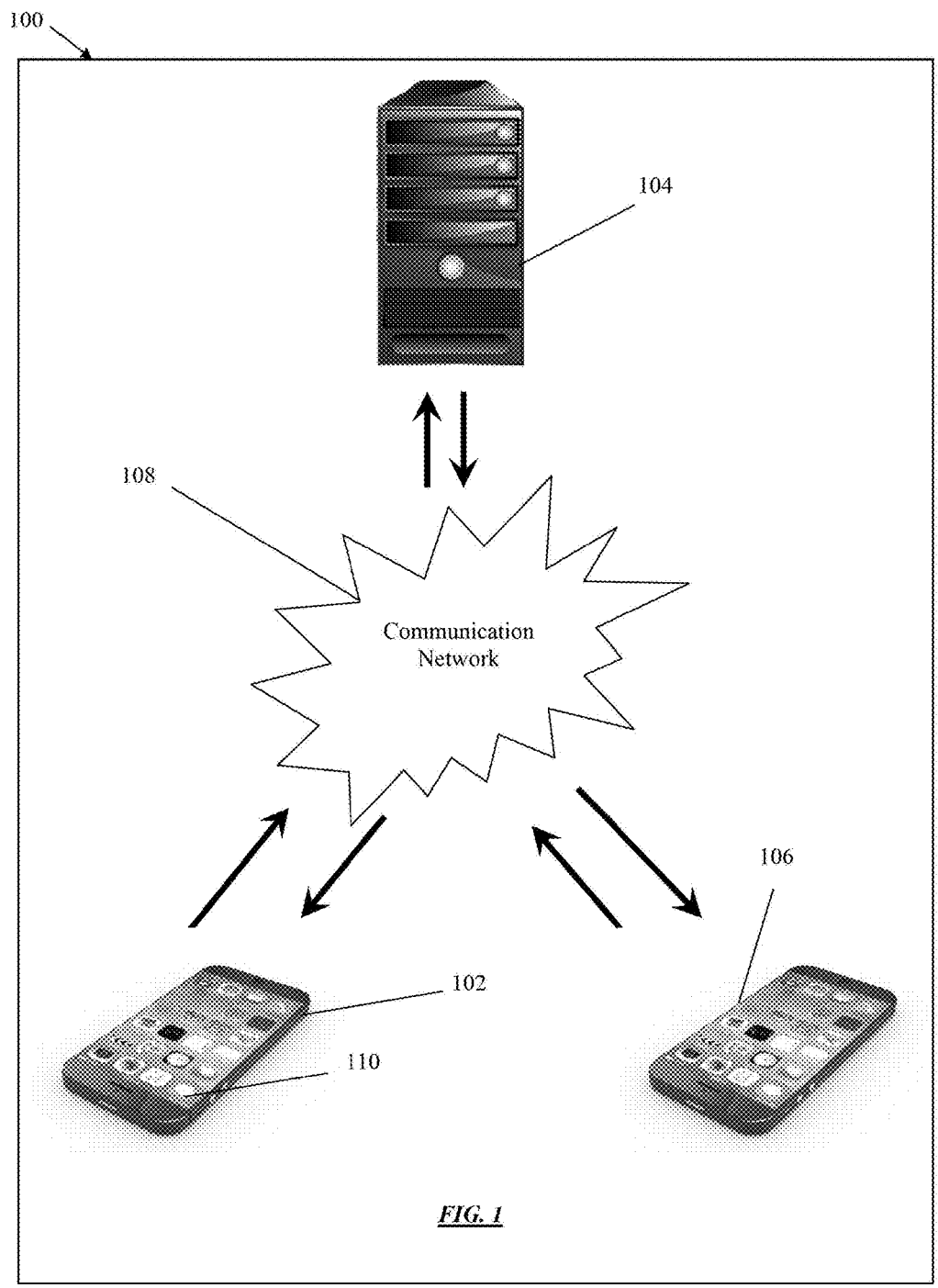
FIG. 1 is a diagram depicting one preferred embodiment of a computer network system, including devices and communication network, which may be utilized to implement the methods according to the present invention.

FIG. 1 depicts a diagram of one preferred embodiment of a computer network system for communication 100, including devices 102, 104, and 106, and communication network 108, which may be utilized to implement the methods according to the present invention. In this preferred embodiment, the device 102 is a smart phone such as those discussed above or the Apple iPhone, the device 104 is a server such as those discussed above or the Hewlett-Packard Server, and the device 106 is also a smart phone, such as the Apple iPhone. Execution of the present methods is not limited to iOS operating systems and other operating systems such as Android operating systems can be utilized. Execution of the methods discussed herein may be initiated by tapping on an icon 110, known to artisans of ordinary skill as an App. The devices 102, 104, and 106 communicate through the communication network 108. The communication network 108 can be a combination of wired and wireless networks and comprises at least one of the Internet, Wi-Fi, phone lines, ground-based communication devices and software, routers, cables, interface software, air-based communication devices, satellites, and satellite transceivers. Execution of the steps included in the several methods discussed herein may be divided and performed separately by the devices making up the computer network system for communication 100. As known to artisans of ordinary skill, all the devices in the computer network system for communication 100, including the devices 102, 104, and 106, have processing systems and program codes, stored on storage devices of these devices, which when executed, perform one or more of the several methods of the present invention.

The App 110 may be used to execute the steps of one or more of the several methods discussed herein. For instance, the user of the device 102, referred to as the sender, taps on the App 110 and is presented with a user interface, discussed in more details below, to compose a text message for a recipient using the device 106. The sender, using the device 102, uses the App 110 to compose a text message. In one preferred embodiment, all users of the devices 102 and 106 are originally assigned a default animation character. The sender may use the App 110 to select an animation character of his/her choice, discussed in more details below. The sender, using the device 102, uses the App 110 to transmit the text along with the animation character to the recipient using the device 106, via the communication network 108 and server systems using, servers such as the server 104 having processing units and program codes to manage the transmission and reception of communications between the users including the electronics messages and animation characters using devices such as the devices 102 and 106.

The device 106 also includes the App 110 which may be used to execute one or more of the steps of the several methods discussed herein. In one preferred embodiment, the user of the device 106, referred to as the recipient, is notified via badges, alerts, or banners, that an electronic message has been received. The user of the device 106 taps on the App 110 and is presented with a user interface, discussed in more details below, to be presented with an animated text according to the present invention. The recipient, using the device 106, uses the App 110 to receive the electronic message and animation character from the sender using the device 102. The recipient, using the device 106, uses the App 110 to convert the electronic message into speech, generate moving images of the animation character, output the speech via the speakers of the device 106, and display the moving images via the display screen of the device 106. As such, the plane text and selected animation character of the sender is transformed into a presentation where moving images of the animated character speaks the words of the text. For example, the sender, using, the device 102 and App 110, composes a text message to his boss stating: "I just closed the 10 million dollar deal and I'll be flying back first class and I don't want to be questioned about my travel expenses. What you have to ask yourself is, do I feel lucky. Well do ya' punk?" and selects an image of Clint Eastwood as the animation character and the intended recipient, i.e. his, boss, using the device 106 and App 110, displays moving images of Clint Eastwood uttering the words: "I just closed the 10 million dollar deal and be flying back first class and I don't want be questioned about my travel expenses. What you, have to ask yourself is, do I feel lucky. Well do ya' punk?" In one preferred embodiment, the App 110 provides such catch phrases associated with famous animation characters like Clint Eastwood to be selected and included in the electronic message.

In one preferred embodiment, the sender, using the device 102, uses the App 110 to compose a text, select an animation character, convert the text into speech, generate moving images of the animation character, and transmit the speech and moving images to the recipient using the device 106, via the communication network 108 and the server 104, as discussed above. The intended recipient, using the device 106 uses the App 110 to receive the speech and moving images, and to output the speech and display the moving images via its speakers and display screen.

In one preferred embodiment, the server 104 receives a text message and animation character from a user using the device 102. The server 104 converts the text into speech, generates moving images of the animation character, and transmits the speech and moving images to a recipient using the device 106, via the communication network 108.

The above methods may be supplemented with additional steps. In one preferred embodiment, the sender, using the device 102, uses the App 110 to further select a background-music identifier and transmits a text, an animation character, and the background-music identifier to a recipient using the device 106, via the communication network 108, as discussed above. The recipient, using the device 106, uses the App 110 to receive the electronic message, animation character, and background-music identifier from the sender using the device 102. The recipient, using the device 106, uses the App 110 to convert the electronic message into speech, generate moving images of the animation character, output the speech via the speakers of the device 106, display the moving images via the display screen of the device 106, and output a background music according to the background-music identifier. As such, the plane text and selected animation character of the sender is transformed into a presentation where moving images of the animated character speaks the words of the text while a background music is played. For example, the sender, using the device 102 and App 110, composes a text message to her boyfriend stating: "Hi love, I just bought a dress that cost 10,000 dollars. BTW, you complete me!", selects an image of Renee Zellweger as the animation character, and a background-music identifier which identifies the song Secret Garden by Bruce Springsteen, and the intended recipient, i.e. her boyfriend, using the device 106 and App 110, displays moving images of Renee Zellweger uttering the words: "Hi love, I just bought a dress that cost 10,000 dollars. By the way, you complete me!" while the song Secret Garden plays in the background. In one preferred embodiment, the App 110 provides such background-music identifiers associated with famous movies like Jerry Maguire be selected by the user.

In one preferred embodiment, the sender, using the device 102, uses the App 110 to further select a type of animation and transmits a text, an animation character, and the type of animation to a recipient using the device 106, via the communication network 108, as discussed above. The recipient, using the device 106, uses the App 110 to receive the electronic message, animation character, and type of animation from the sender using the device 102. The recipient, using the device 106, uses the App 110 to convert the electronic message into speech, generate moving images of the animation character according to the type of animation, output the speech via the speakers of the device 106, and display the moving images via the display screen of the device 106. As such, the plane text and selected animation character of the sender is transformed into a presentation where moving images of the animated character, according to the selected type of animation, utters the words of the text. For example, the sender, using the device 102 and App 110, composes a text message to his daughter stating "What's up doc?" selects an image of Bugs Bunny as the animation character, and selects tap dancing as the type of animation, and the intended recipient, i.e. his daughter, using the device 106 and App 110, displays moving images of Bugs Bunny tap dancing and uttering the words: "What's up doc?" In one preferred embodiment, the App 110 provides such animation types to be selected by the user.

An App, such as the App 110, may be further configured to include methods of providing a user interface to facilitate a visual representation of the methods of communication discussed herein. The user interface may be implemented on one or more devices such as the devices, 102, 104, and 106, separately or in combination. A user, such as the sender or recipient discussed above, may utilize the App 110 so configured, to perform these methods. In the following and in relation to the discussion of the user interface, the term "box" is used to denote a region of the display page where the user of the interface may tap to execute one or more steps of a particular method. The box may include hyperlinks or hypertexts, depending on the embodiment being discussed.

Figure 2:
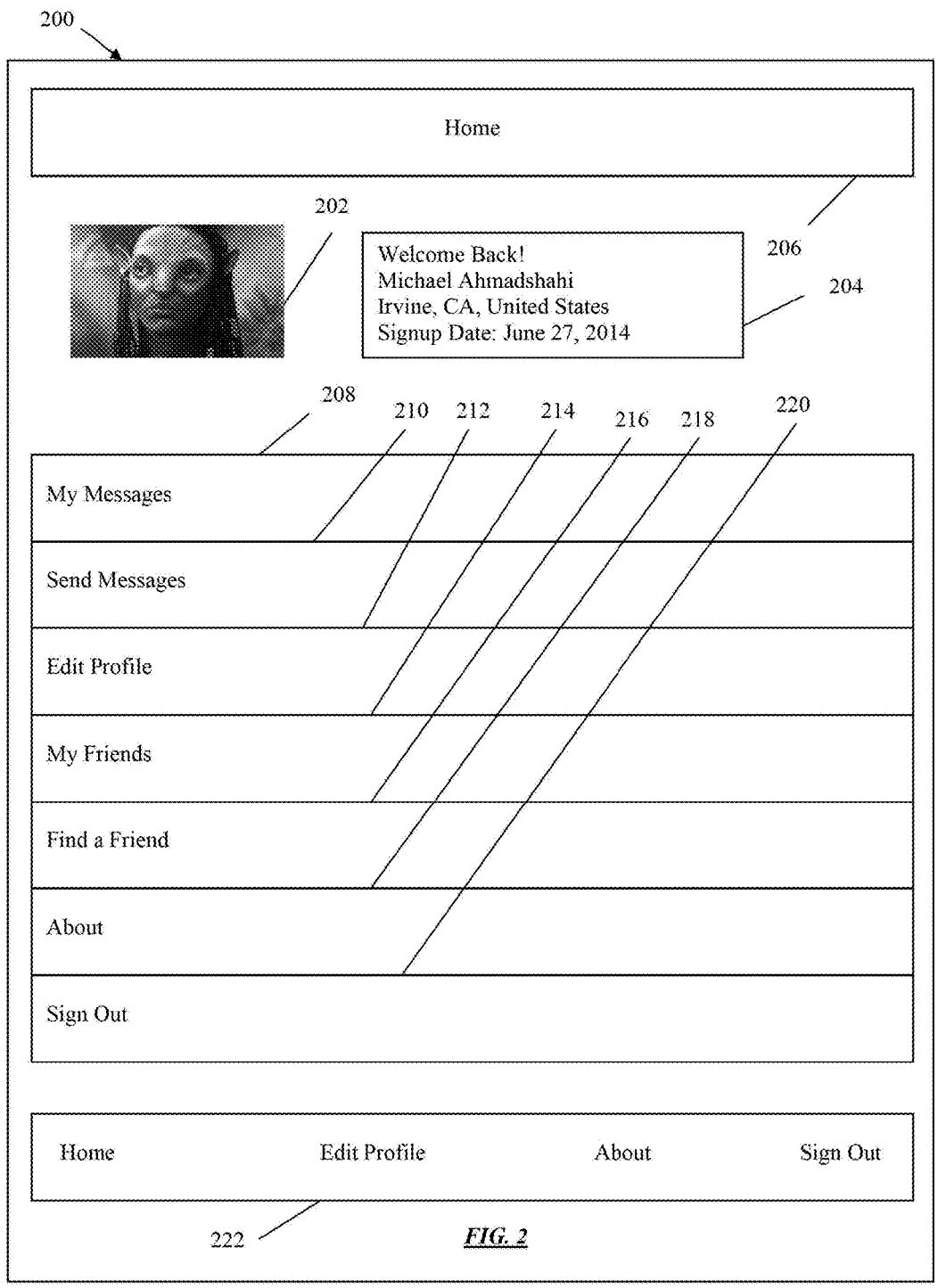
FIG. 2 shows one preferred method of providing a user interface for communicating in accordance with the present invention.

FIG. 2 shows one preferred method of providing a user interface for communicating 200 in accordance with the present invention. A box 206 includes the title of the page "Home." A box 202 shows the user's animation character. When a recipient receives the user's electronic message, the recipient will be presented with moving images of this animation character uttering the text of the user's message. A box 204 shows certain information regarding the user's name, address, and the signup date when the user joined the service. A box 208 shows the user's messages and when tapped it will direct the user to another page entitled "My Messages." A box 210 shows how the user may send messages and when tapped it will direct the user to another page entitled "Send Messages." A box 212 shows how the user may edit his/her profile and when tapped it will direct the user to another page entitled "Edit Profile." A box 214 shows, the user's friends (other users) and when tapped it will direct the user to another page entitled "My Friends." A box 216 shows how the user may find a friend (other users) and when tapped it will direct the user to another page entitled "Find a Friend." A box 218 shows information about the user interface and when tapped it will direct the user to another page entitled "About." A box 220 shows how may sign out of the service and when tapped it will direct the user to another page entitled "Sign Out." A box 222 provides some of the above options and when tapped on a specific option it will direct the user to another page with the corresponding title.

Figure 3:
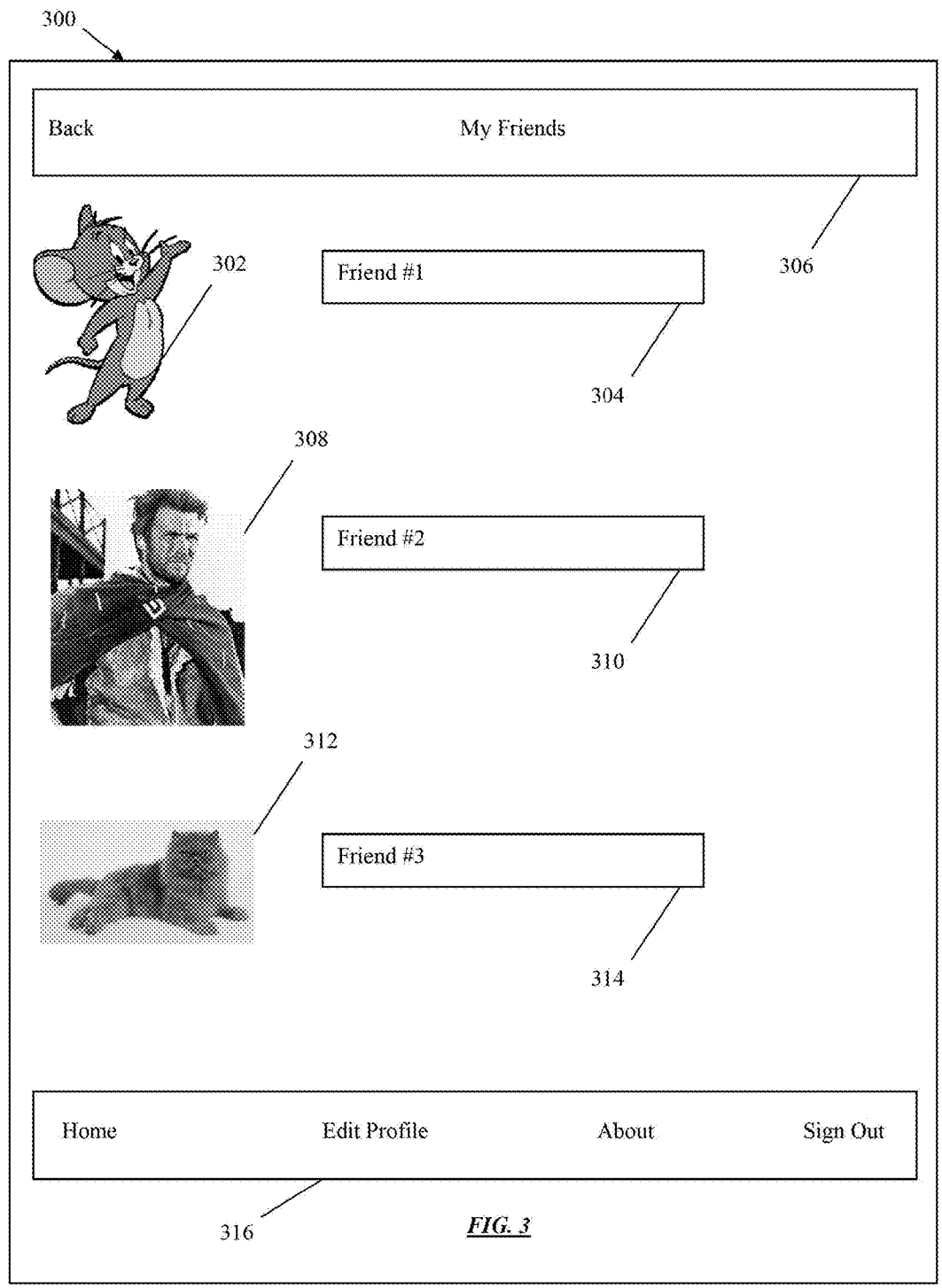
FIG. 3 shows one preferred method of providing a user interface for communicating in accordance with the present invention.

FIG. 3 shows one preferred method of providing a user interface for communicating 300 in accordance with the present invention. A box 306 includes the title of the page "My Friends." Boxes 302, 308, and 312 show animation characters of the user's friends. The box 302 shows the animation character of Jerry the Mouse, the box 308 shows the animation character of Clint Eastwood, and the box 312 shows the animation character of a cat. Boxes 304, 310, and 314 show the names of the user's friends and when tapped it will direct the user to another page whose title is the name of the friend whose box was tapped. The box 304 shows the user's Friend #1 whose animation character is Jerry the Mouse, Friend #2 whose animation character is Clint Eastwood, and Friend #3 whose animation character is a cat. In this example, the user has only three friends and all the information fits within one page. This and other pages are scrollable so that the user can be presented with the entirety of the information. A box 316 provides some of the above options and when tapped on a specific option it will direct the user to another page with the corresponding title.

Figure 4:
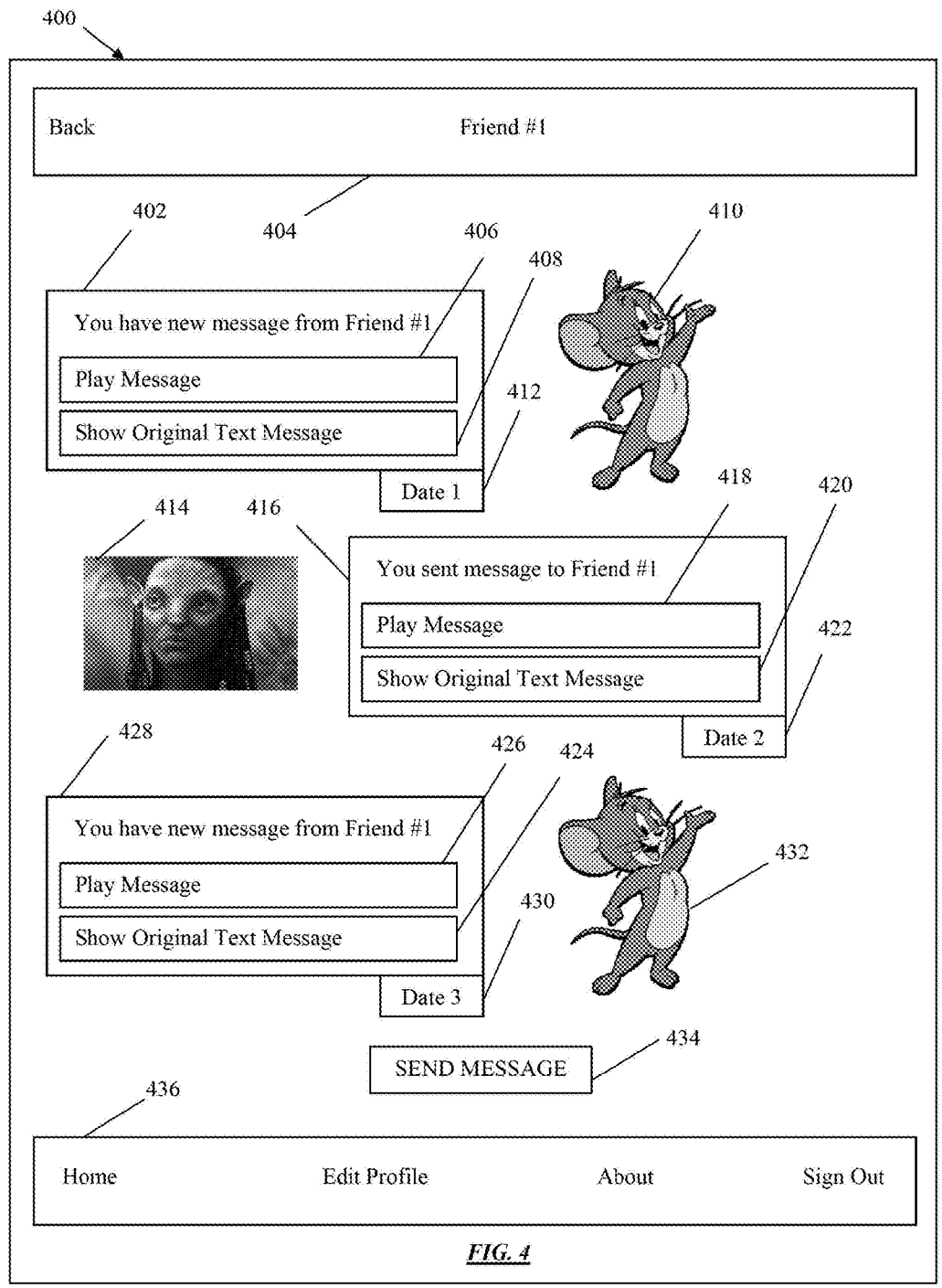
FIG. 4 shows one preferred method of providing a user interface for communicating in accordance with the present invention.

FIG. 4 shows one preferred method of providing a user interface for communicating 400 in accordance with the present invention. A box 404 includes the title of the page "Friend #1." This page shows all the communications between the user and Friend #1. A box 402 includes the title "You have a new message from Friend #1. The box 402 further includes a box 406 entitled "Play Message" and a box 408 entitled "Show Original Text Message." A box 412 shows the date (Date 1) when the message was delivered. When the user taps on, the box 406, the user will be directed to another page entitled "Play Friend #1 Message," see FIG. 6 discussed in more details below. When the user taps on the box 408, the user will be directed to another page entitled "Show Friend #1 Original Text Message." A box 410 shows the animation character of Friend #1.

A box 416 includes the title "You sent message to Friend #1. The box 416 further includes a box 418 entitled "Play Message" and a box 420 entitled "Show Original Text Message." A box 422 shows the date (Date 2) when the message was sent. When the user taps on the box 418, the user will be directed to another page entitled "Play My Message." When the user taps on the box 420, the user will be directed to another page entitled "Show My Original Text Message," see FIG. 7 discussed in more details below. A box 414 shows the animation character of the user.

A box 428 includes the title "You have a new message from Friend #1. The box 428 further includes a box 426 entitled "Play Message" and a box 424 entitled "Show Original Text Message." A box 430 shows the date (Date 3) when the message was delivered. When the user taps on the box 426, the user will be directed to another page entitled "Play Friend #1 Message," and when the user taps on the box 424, the user will be directed to another page entitled "Show Friend #1 Original Text Message." A box 432 shows the animation character of Friend #1.

A box 434 includes the title "Send Message" and when tapped it will direct the user to another page entitled "Send Message," see FIG. 5 discussed in more details below. A box 436 provides some of the above options and when tapped on a specific option it will direct the user to another page with the corresponding title.

As stated above, this page contains all the communications between the user and Friend #1 and it may be scrolled up and down so that the entirety of the communications can be seen and/or accessed. Additionally, the boxes 410, 414, and 432 show the animation characters of the user and Friend #1 at the time the messages were delivered and sent. In other words, although FIG. 4 show the same animation character, Jerry the Mouse, for Friend #1 on the dates Date 1 and Date 3, these animation characters can be different depending on which animation character Friend #1 selected when sending his/her message. The same is true for the user's animation character which can be different on different dates.

Figure 5:
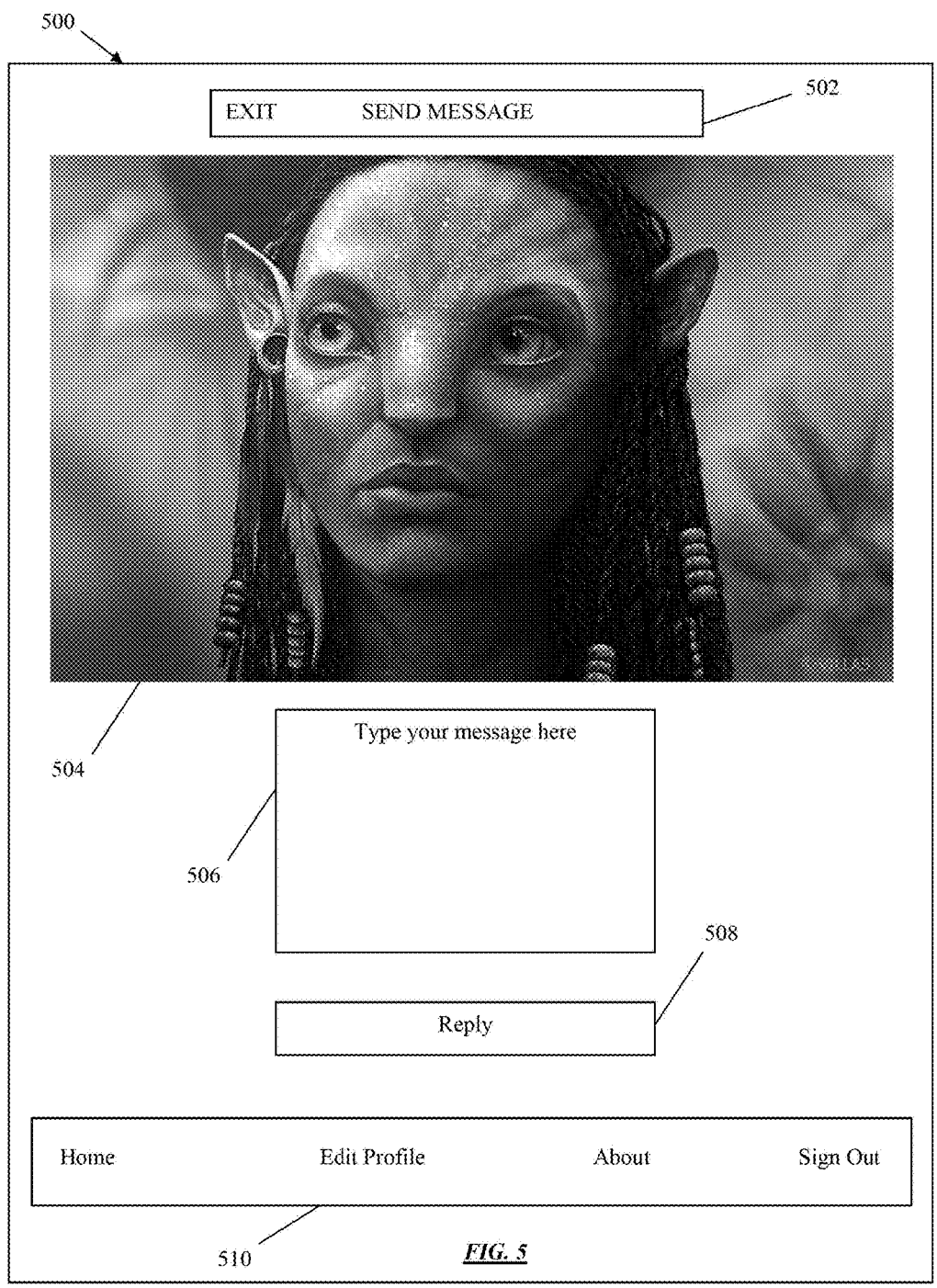
FIG. 5 shows one preferred method of providing a user interface for communicating in accordance with the present invention.

FIG. 5 shows one preferred method of providing a user interface for communicating 500 in accordance with the present invention. A box 502 includes the title of the page "Send Message." This page is presented for the user to compose his/her electronic message. A box 504 shows the user's animation character, in this case the image of the Avatar character in the movie "Avatar." In one instance, when the user is directed to this page, the use is presented with the moving images of the animation character Avatar uttering the words "Please Send Your Message." A box 506 includes the title "Type your message here" and when tapped by the user, the user device, such as the device 102, provides a means such as a keyboard for the user to input the text. A box 508 includes the title "Reply" and when pressed causes the message to be transmitted. As discussed above, the steps of electronic message to speech conversion and generation of moving images of the animation character may occur by the user's device, the server, or recipient device. As such, if the user device is so designated, tapping on the box 508 performs those steps and transmits the speech and moving images. A box 510 provides some of the above options and when tapped on a specific option it will direct the user to another page with the corresponding title.

Figure 6:
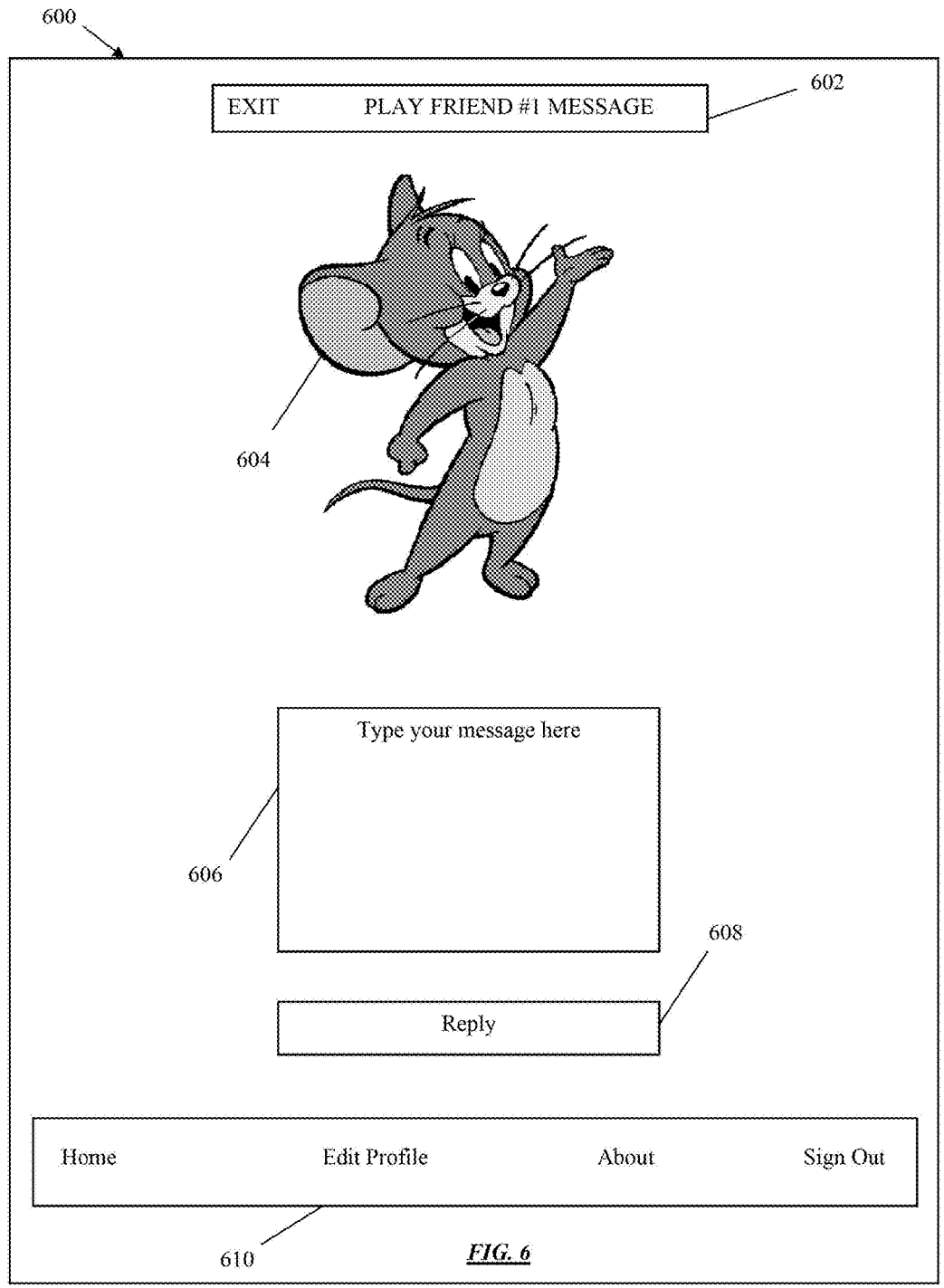
FIG. 6 shows one preferred method of providing a user interface for communicating in accordance with the present invention.

FIG. 6 shows one preferred method of providing a user interface for communicating 600 in accordance with the present invention. A box 602 includes the title of the page "Play Friend #1 Message." This page is presented for the user to watch Friend #1's electronic message. A box 604 is used to display moving images of Friend #1's animation character while uttering the words of Friend #1's electronic message. The images may be 2D or 3D animated images of Friend #1's animation character as discussed above. In this illustrative example, Friend #1 had selected Jerry the Mouse for his/her animation character when he/she composed his/her message and the user/recipient watches Jerry the Mouse's moving images present Friend #1's message.

A box 606 includes the title "Type your message here" and when tapped by the user, the user device, such as the device 106, provides a means such as a keyboard for the user to input the text. A box 608 includes the title "Reply" and when pressed causes the message to be transmitted. As discussed above, the steps of electronic message to speech conversion and generation of moving images of the animation character may occur by the user's device, the server, or recipient device. As such, if the user device is so designated, tapping on the box 608 performs those steps and transmits the speech and moving images. A box 610 provides some of the above options and when tapped on a specific option it will direct the user to another page with the corresponding title.

Figure 7:
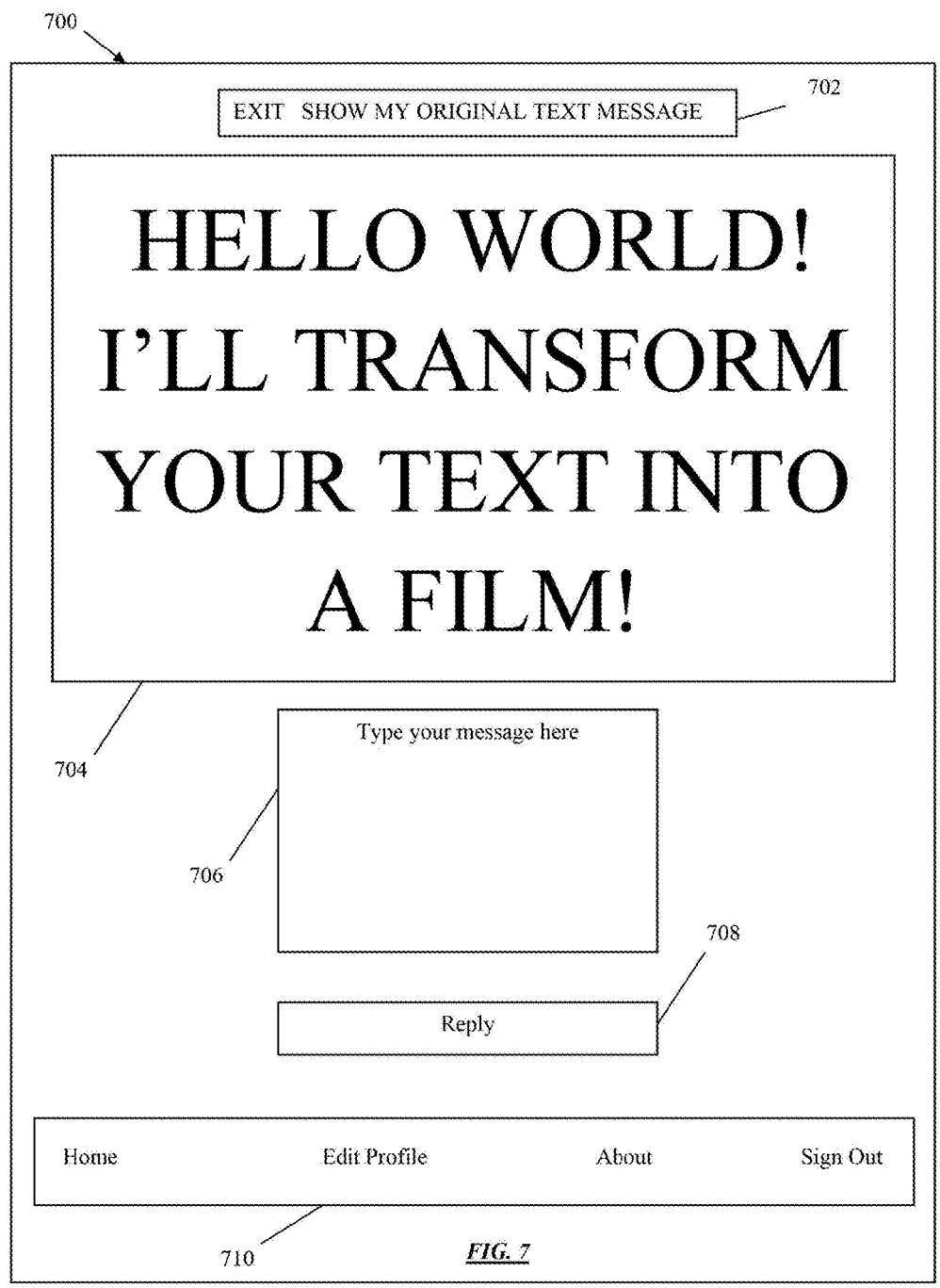
FIG. 7 shows one preferred method of providing a user interface for communicating in accordance with the present invention.

FIG. 7 shows one preferred method of providing a user interface for communicating 700 in accordance with the present invention. A box 702 includes the title of the page "Show My Original Text Message." Sometimes, it is desirable to see the actual words of the text. This page is presented for the user to see the actual words of his/her electronic message. A box 704 is used to display the words of the text that was composed by the user. A similar page can be use to present the actual words of the a friend's electronic message. In this illustrative example, the user's text message is "Hello world! I'll transform your text into a film!" In an alternative embodiment, the converted speech can also be played back via the device speakers at the same time it presents the text of the message.

A box 706 includes the title "Type your message here" and when tapped by the user, the user device, such as the device 102, provides a means such as a keyboard for the user to input the text. A box 708 includes the title "Reply" and when pressed causes the message to be transmitted. As discussed above, the steps of electronic message to speech conversion and generation of moving images of the animation character may occur by the user's device, the server, or recipient device. As such, if the user device is so designated, tapping on, the box 708 performs those steps and transmits the speech and moving images. A box 710 provides some of the above options and when tapped on a specific option it will direct the user to another page with the corresponding title.

Figure 8:
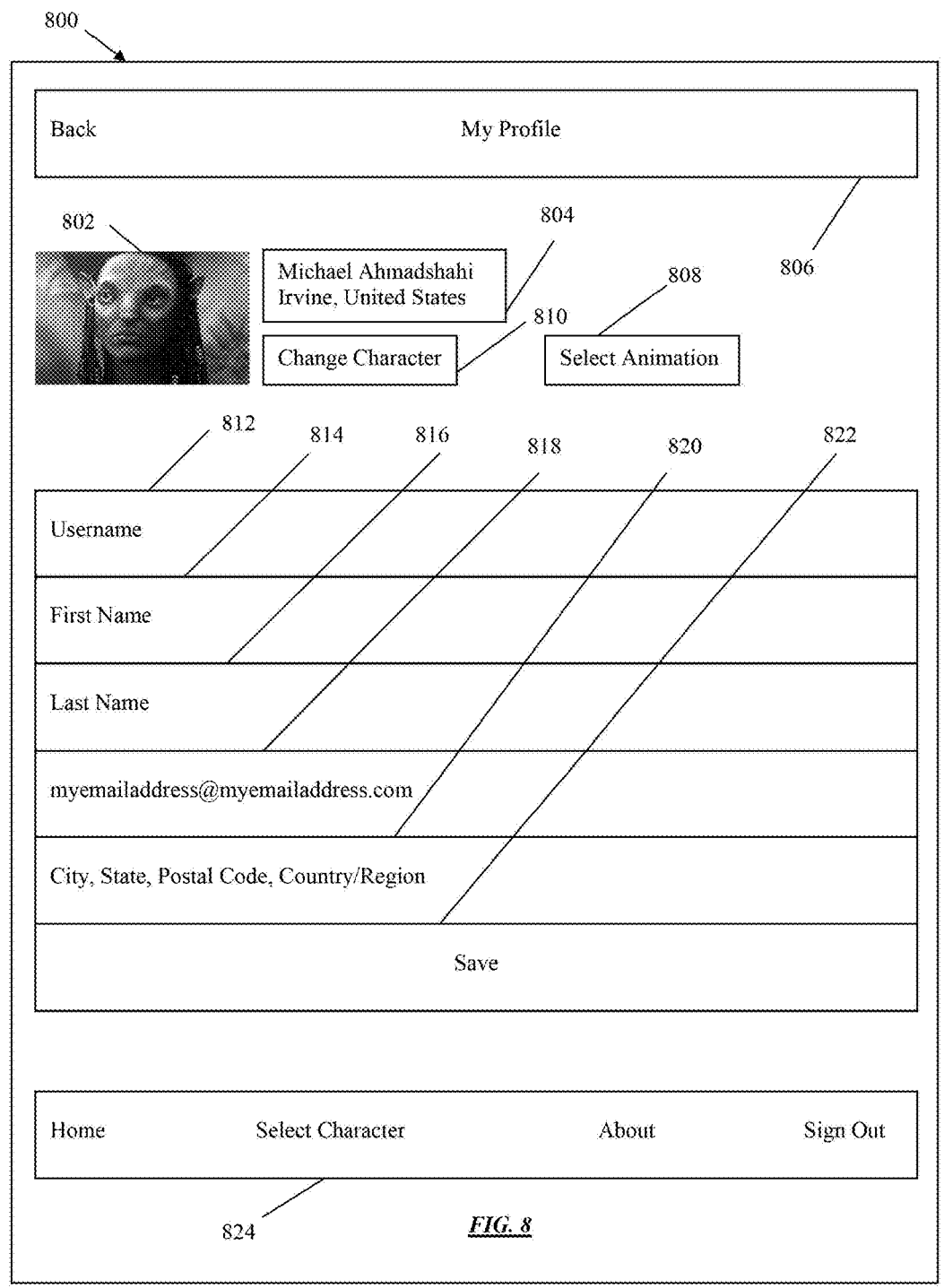
FIG. 8 shows one preferred method of providing a user interface for communicating in accordance with the present invention.

FIG. 8 shows one preferred method of providing a user interface for communicating 800 in accordance with the present invention. A box 806 includes the title of the page "My Profile." A box 802 shows the user's animation character. When a recipient receives the user's electronic message, the recipient will be presented with moving images of this animation character uttering the text of the user's message. In this illustrative example, the user selected the Avatar character for his/her animation character. A box 804 shows certain information regarding the user's name and address.

A box 808 includes the tile "Select Animation" and when tapped it will direct the user to another page entitled "Select Animation." As discussed above in relation to 2D and 3D computer generated animation techniques, a user can select a particular animation for his/her animation character. For instance, a table can be presented from which the user may select the animation character. The table may include different types of animation such as "tap dancing, "opera signing," "cat voice," John Wayne Walk," "Clint Eastwood Voice," etc. As such, the above mentioned image animation and voice synthesization techniques can be used to generate moving images and speech that are according to the selected animation type. For instance, the user may select his selfie as his animation character and select "John Wayne Walk" and "John Wayne's Voice" as the animation type and the recipient is presented with the sender's selfie walking like John Wayne's distinctive walk and uttering the sender's text message in John Wayne's distinctive voice.

A box 810 includes the tile "Change Character" and when tapped it will direct the user to another page entitled "Change Character," discussed in more details below in relation with FIG. 9. A box 812 shows how the user may edit his/her username and when tapped it will presented with, an input means, such as the keyboard of the device 102. A box 812 shows how the user may edit his/her username and when tapped it will presented with an input means, such as the keyboard of the device 102. Boxes 814, 816, 818, 820, and 822 show how the user may edit his/her first name, last name, email address, residence, and to save the changes, respectively, using the device 102's keyboard. A box 824 provides some of the above options and when tapped on a specific option it will direct the user to another page with the corresponding title.

Figure 9:
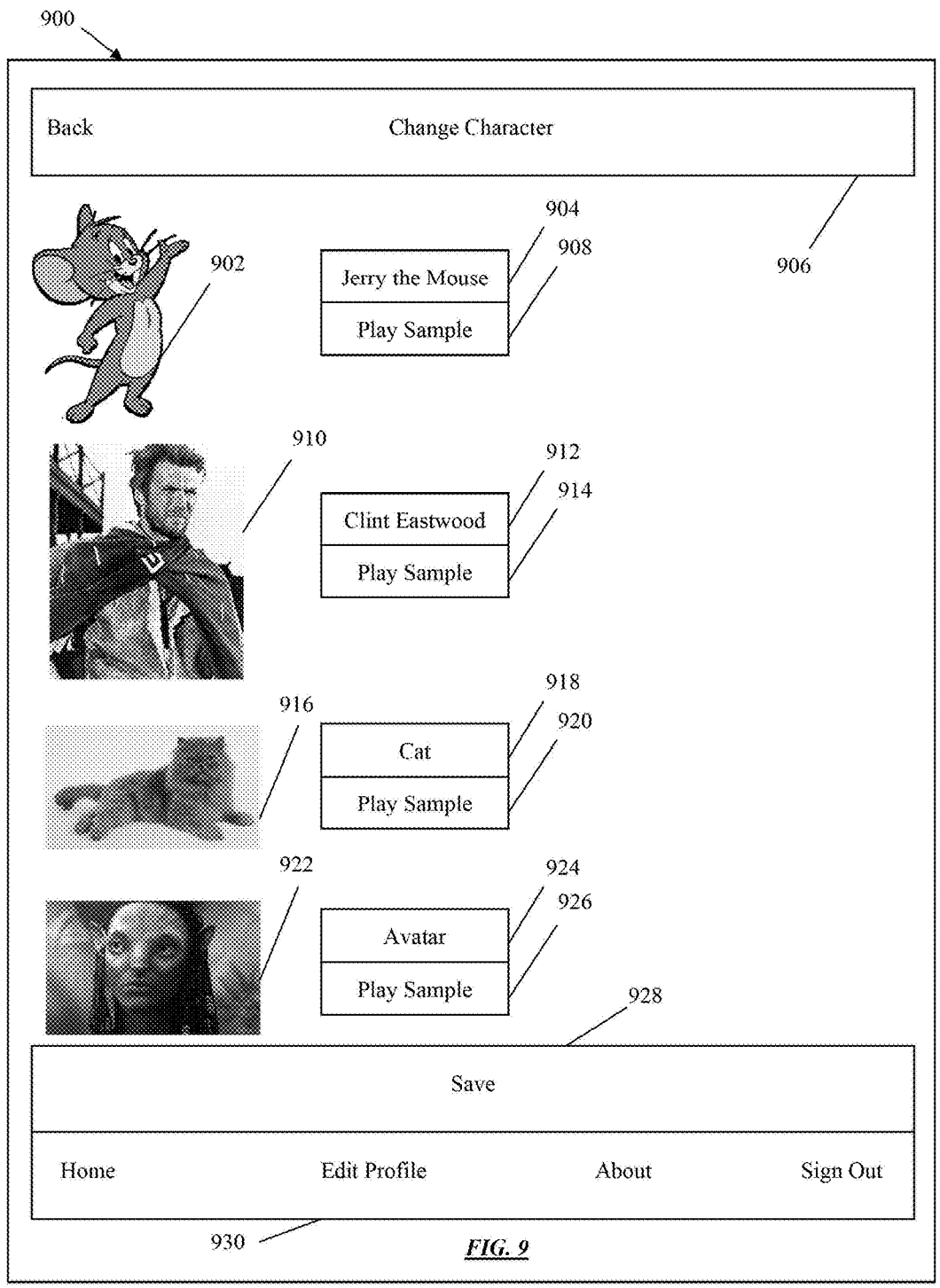
FIG. 9 shows one preferred method of providing a user interface for communicating in accordance with the present invention.

FIG. 9 shows one preferred method of providing a user interface for communicating 900 in accordance with the present invention. A box 906 includes, the title of the page "Change Character." Boxes 902, 910, 916, and 922 show images of animation characters that a user may select as his/her animation character. The box 902 shows the animation character of Jerry the Mouse, the box 910 shows the animation character of Clint Eastwood, the box 916 shows the animation character of a cat, and the box 922 shows the animation character Avatar. Boxes 904, 912, 918, and 924 show the names of the animation characters. In this illustrative example, the box 904 shows the name of the animation character Jerry the Mouse, the box 912 shows the name of the animation character Clint Eastwood, the box 916 shows the name of the animation character Cat, and the box 922 shows the name of the animation character Avatar Boxes 908, 914, 920, and 926 include the title "Play Sample." When tapped, the user is directed to another page and will be presented with a sample of moving images and synthesized speech of the corresponding animation character. A box 928 includes the title "Save" and when tapped the user's animation character is changed. A box 930 provides some of the above options and when tapped on a specific option it will direct the user to another page with the corresponding title.

Figure 10:
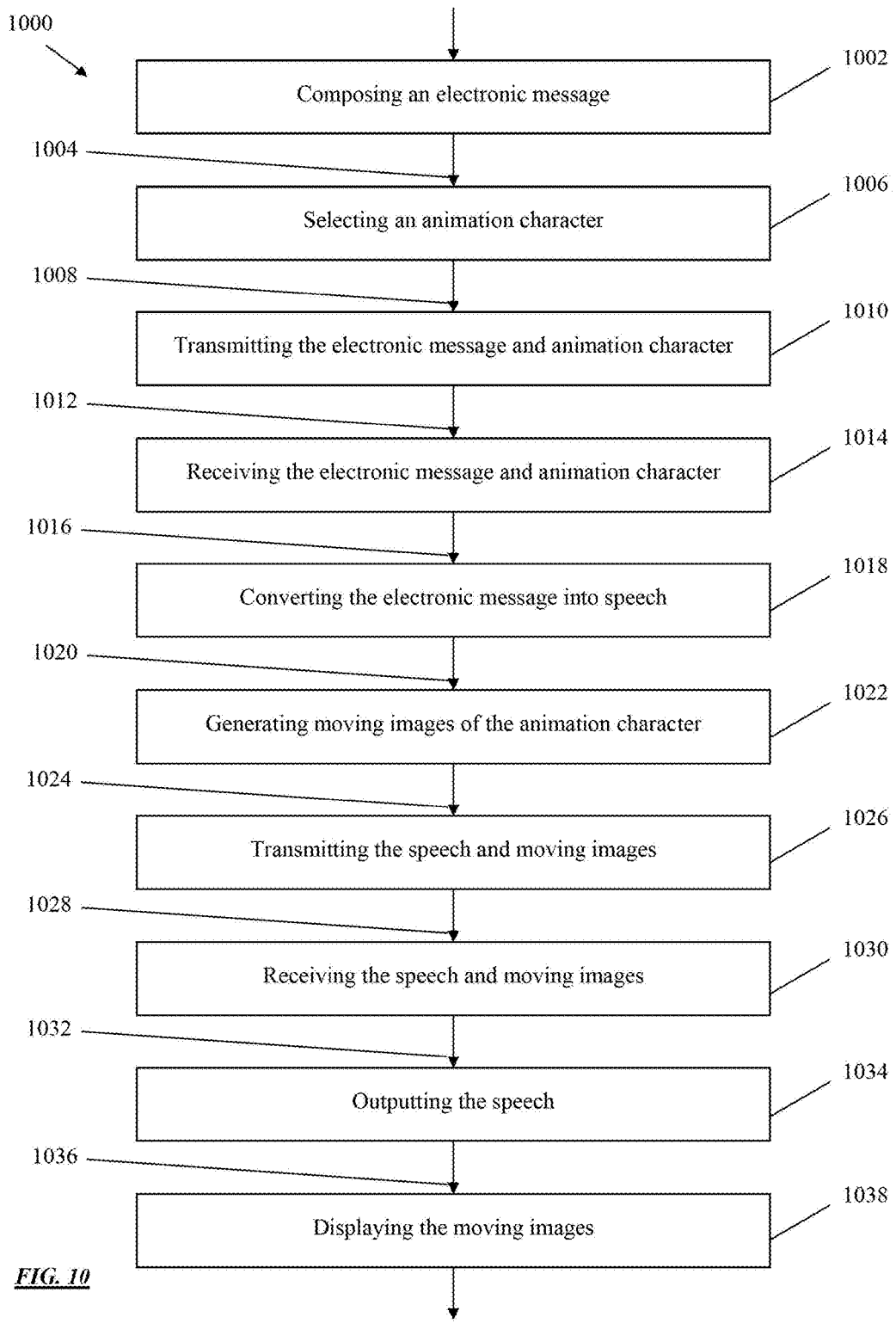
FIG. 10 shows a flow diagram of one preferred method of communicating in accordance with the present invention.

FIG. 10 shows a flow diagram 1000 of one preferred method of communicating in accordance with the present invention which may be implemented utilizing the computer network system depicted in FIG. 1. According to this embodiment, the method comprises composing an electronic message, such as a text message, via the device 102, at 1002.

The method further comprises selecting an animation character, via the device 102, at 1006. The method further comprises transmitting the electronic message and animation character, via the device 102, at 1010. The method further comprises receiving the electronic message and animation character, via the device 104, at 1014. The method further comprises converting the electronic message into speech, via the device 104, at 1018. The method further comprises generating moving images of the animation character, via the device 104, at 1022. The method further comprises transmitting the speech and moving images, via the device 104, at 1026. The method further comprises receiving the speech and moving images, via the device 106, at 1030. The method further comprises outputting the speech, via the device 106, at 1034. The method further comprises displaying the moving images, via the device 106, at 1038.

Figure 11:
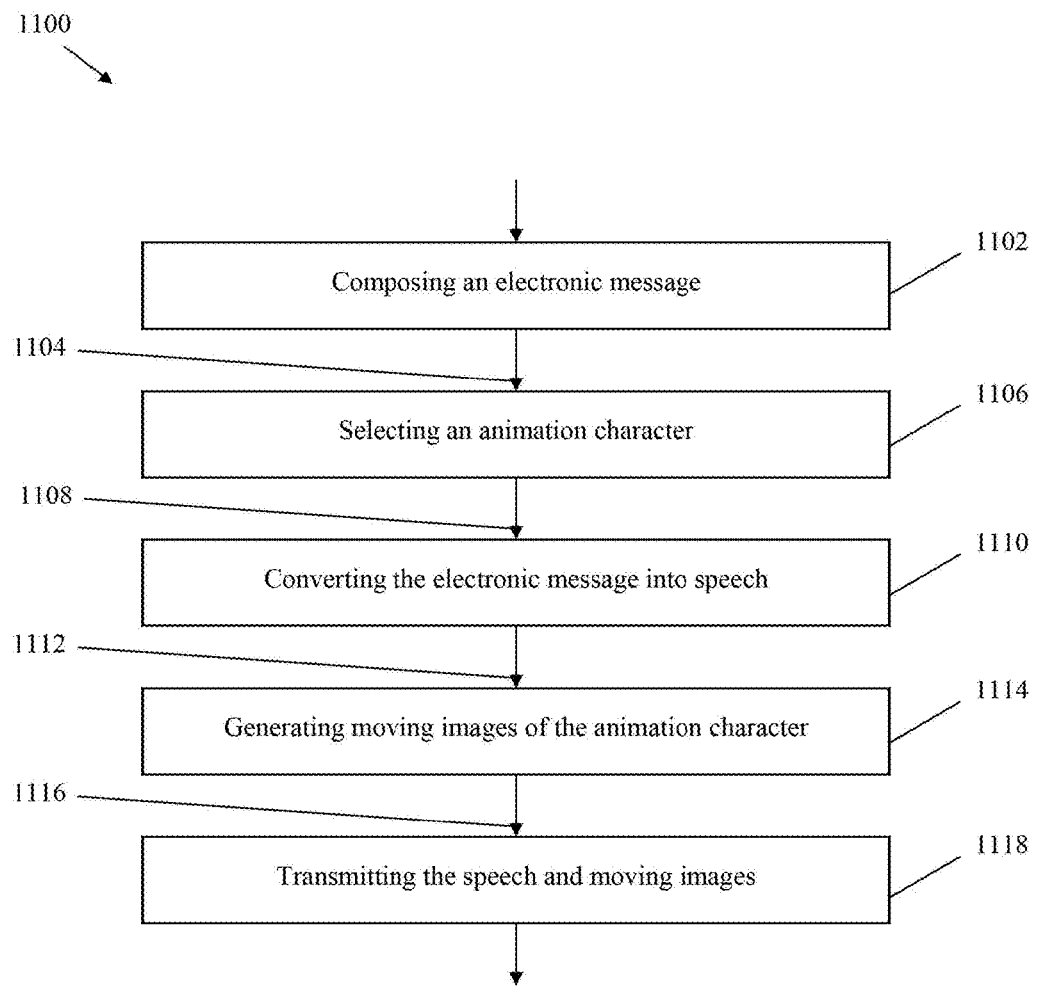
FIG. 11 shows a flow diagram of one preferred method of communicating in accordance with the present invention.

FIG. 11 shows a flow diagram 1100 of one preferred method of communicating in accordance with the present invention which may be implemented utilizing the computer network system depicted in FIG. 1. According to this embodiment, the method comprises composing an electronic message, such as an email, via the device 102, at 1102. The method further comprises converting the electronic message into speech, via the device 102, at 1110. The method further comprises generating moving images of the animation character, via the device 102, at 1114. The method further comprises transmitting the speech and moving images, via the device 102, at 1118.

Figure 12:
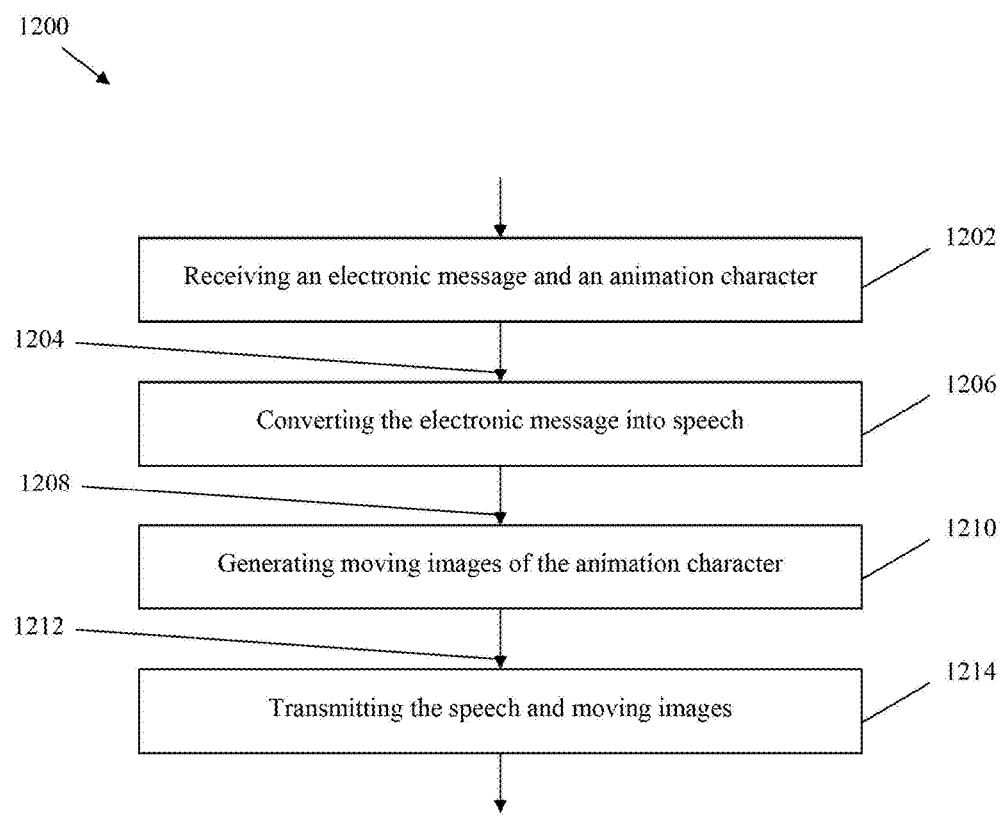
FIG. 12 shows a flow diagram of one preferred method of communicating in accordance with the present invention.

FIG. 12 shows a flow diagram 1200 of one preferred method of communicating in accordance with the present invention which may be implemented utilizing the computer network system depicted in FIG. 1. According to this embodiment, the method comprises receiving an electronic message and an animation character, via the device 104, at 1202. The method further comprises converting the electronic message into speech, via the device 104, at 1206. The method further comprises generating moving images of the animation character, via the device 104, at 1210. The method further comprises transmitting the speech and moving images, via the device 104, at 1214.

Figure 13:
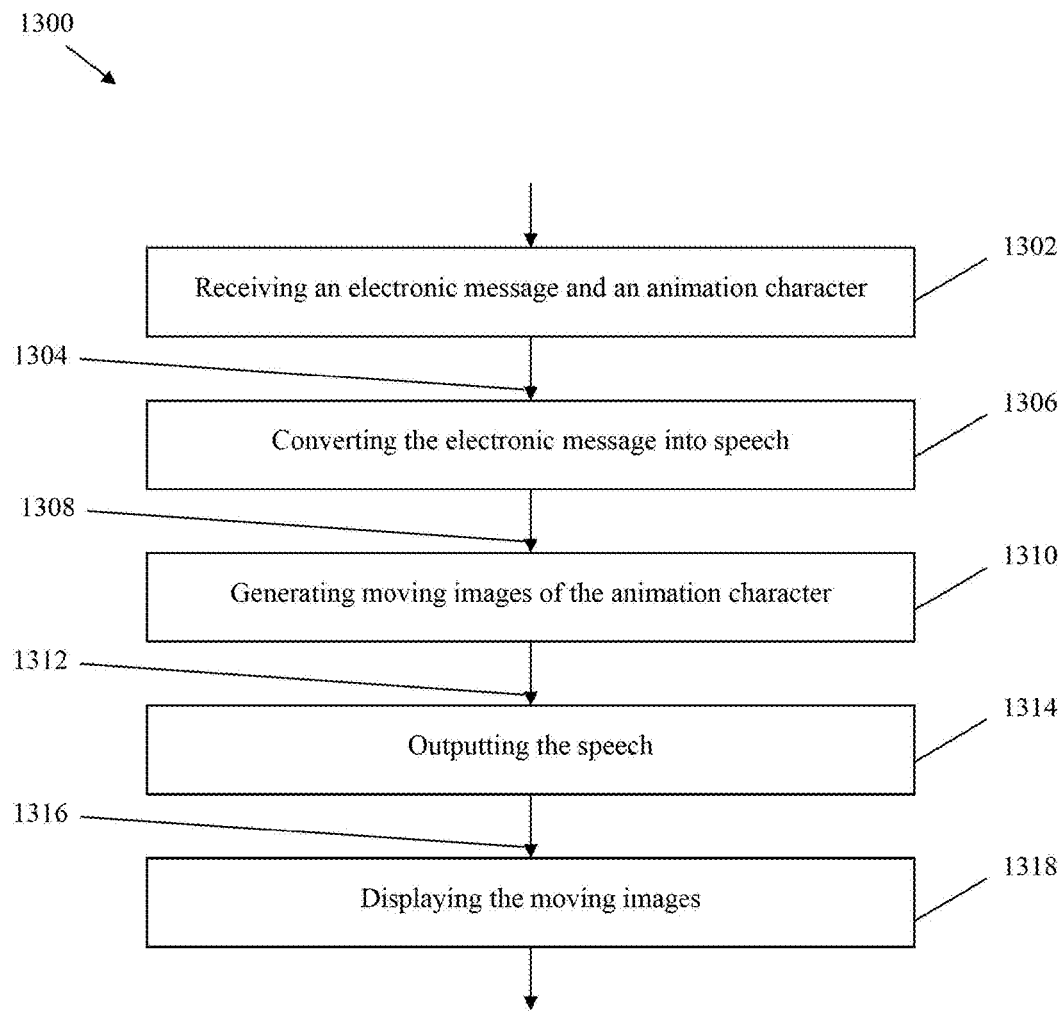
FIG. 13 shows a flow diagram of one preferred method of communicating in accordance with the present invention.

FIG. 13 shows a flow diagram 1300 of one preferred method of communicating in accordance with the present invention which may be implemented utilizing the computer network system depicted in FIG. 1. According to this embodiment, the method comprises receiving an electronic message and an animation character, via the device 106, at 1302. The method further comprises converting the electronic message into speech, via the device 106, at 1306. The method further comprises generating moving images of the animation character, via the device 106, at 1310. The method further comprises outputting the speech, via the device 106, at 1314. The method further comprises displaying the moving images, via the device 106, at 1318.

Figure 14:
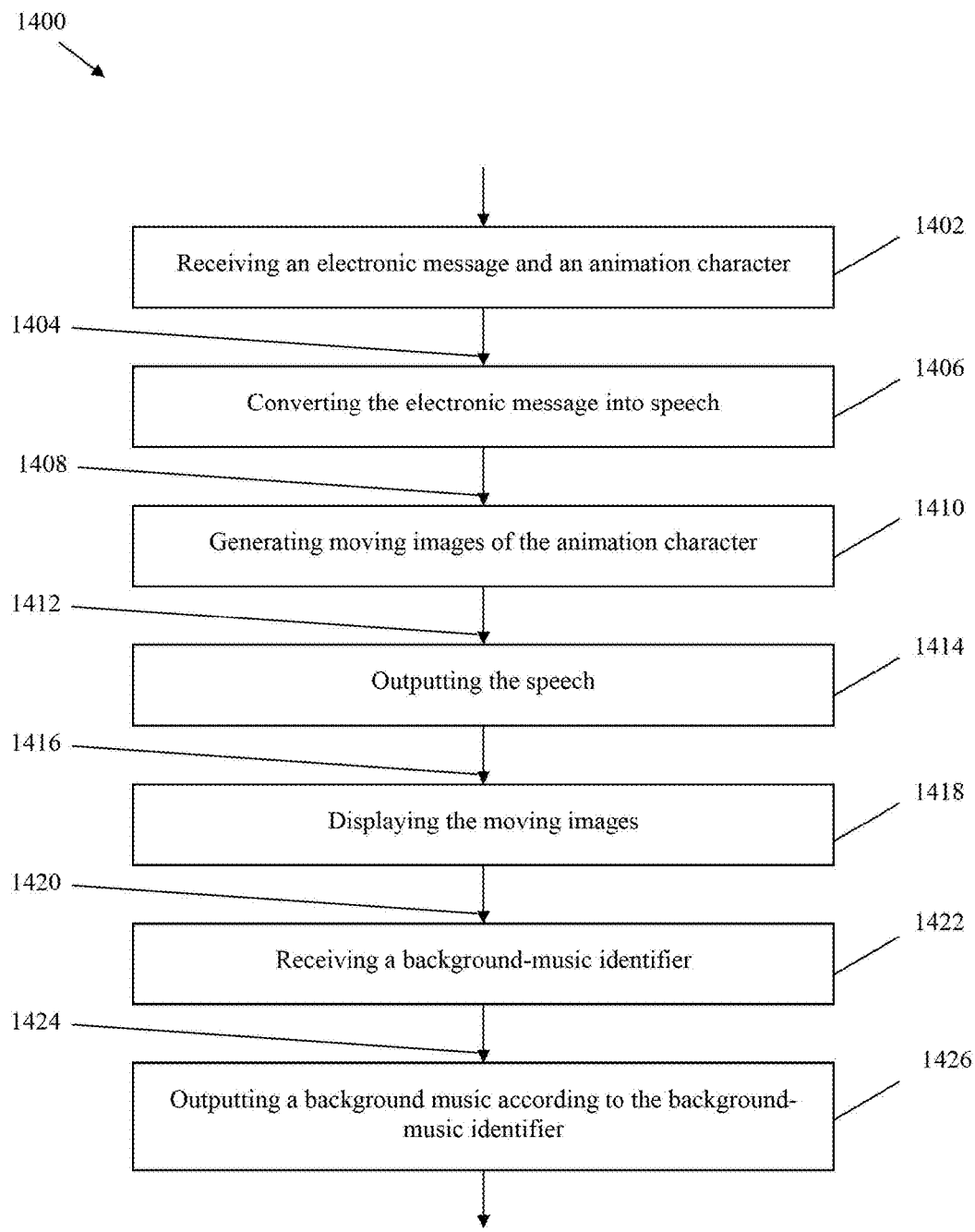
FIG. 14 shows a flow diagram of one preferred method of communicating in accordance with the present invention.

FIG. 14 shows a flow diagram 1400 of one preferred method of communicating in accordance with the present invention which may be implemented utilizing the computer network system depicted in FIG. 1. According to this embodiment, the method comprises receiving an electronic message and an animation character, via the device 106, at 1402. The method further comprises converting the electronic message into speech, via the device 106, at 1406. The method further comprises generating moving images of the animation character, via the device 106, at 1410. The method further comprises outputting, the speech, via the device 106, at 1414. The method further comprises displaying the moving images, via the device 106, at 1418. The method further comprises receiving a background-music identifier, via the device 106, at 1422. The method further comprises outputting a background music according to the background-music identifier, via the device 106, at 1426.

The foregoing discloses methods, mediums, and computer network systems for communicating through electronic messages. To enhance the communication, the electronic message is transformed into moving images of animation characters uttering the content of the electronic message. Methods of the present invention including the user interface may be implemented on devices such as smart phones. It provides users with a platform where they can be creative and transform their plane electronic messages into short films.

The described embodiments can also be embodied as computer readable code on a non-transitory computer readable medium. A non-transitory computer readable medium is any data storage device that can store data which can thereafter be read by a computer system, other than medium designed specifically for propagating transitory signals. Examples of non-transitory computer readable media include floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions. In various embodiments, software-instructions stored on a machine-readable storage medium can be used in combination with hardwired circuitry to implement the present invention. Thus, the techniques are not limited to any specific combination of hardware circuitry and software instructions, or to any particular source for the instructions executed by the data processing system associated with an apparatus for performing one or more of the operations described herein.

User interface comprises components that interact with a user to receive user inputs and to present media and/or information. User interface may include a speaker, microphone, buttons, lights, display screen, touch screen, touch pad, scroll wheel, communication port, or some other user input/output apparatus including combinations thereof.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A machine implemented method of communicating, comprising:
   (i) composing an electronic message, via a first device having a processing unit and program code stored on a storage device of said first device;
   (ii) selecting a well-known animation character, via the first device;
   (iii) transmitting the electronic message, via the first device;
   (iv) transmitting the well-known animation character, via the first device;
   (v) receiving the electronic message, via a server having a processing unit and program code stored on a storage device of said server;
   (vi) receiving the well-known animation character, via the server;

(vii) converting the electronic message into speech using one of synthesized voice and actual voice of a voice impersonator of the well-known animation character, via the server;
(viii) generating moving images of the well-known animation character, via the server;
(ix) transmitting the speech, via the server;
(x) transmitting the moving images, via the server;
(xi) receiving the speech, via a second device having a processing unit and program code stored on a storage device of said second device;
(xii) receiving the moving images, via the second device;
(xiii) outputting the speech, via the second device; and
(xiv) displaying the moving images, via the second device.

2. The method of claim 1, further comprising:
(xv) receiving a background-music identifier, via the second device; and
(xvi) outputting a background music according to the background-music identifier, via the second device.

3. The method of claim 1, further comprising:
(xv) selecting a type of animation, via the first device; and
wherein the step of generating moving images of the well-known animation character comprises generating moving images of the well-known animation character according to the type of animation.

4. The method of claim 3, wherein the type of animation comprises one of happy type, sad type, dramatic type, dancing type, and exercising type.

5. A machine implemented method of communicating, comprising:
(i) receiving an electronic message, via a server having a processing unit and program code stored on a storage device of said server;
(ii) receiving a well-known animation character, via the server;
(iii) converting the electronic message into speech using one of synthesized voice and actual voice of a voice impersonator of the well-known animation character, via the server;
(iv) generating moving images of the well-known animation character, via the server;
(v) transmitting the speech, via the server; and
(vi) transmitting the moving images, via the server.

6. A non-transitory machine-readable storage medium, which provides instructions that, when executed by a processing unit, causes the processing unit to perform communication operations according to a method as in claim 5.

7. A server having a processing unit and program code stored on a storage device of said server, said program code to perform a method as in claim 5 when executed by said processing unit.

8. The method of claim 5, wherein the electronic message is one of instant message, personal message, text message, e-mail, and voicemail.

9. The method of claim 5, wherein the well-known animation character is one of human, animal, cartoon, and avatar.

10. The method of claim 5, wherein the step of converting the electronic message into speech comprises utilizing pre-recorded speech of a voice impersonator of the well-known animation character.

11. The method of claim 5, wherein the step of converting the electronic message into speech comprises synthesizing speech of a voice impersonator of the well-known animation character.

12. The method of claim 5, wherein the step of generating moving images of the well-known animation character comprises utilizing pre-animated images of the well-known animation character.

13. The method of claim 5, wherein the step of generating moving images of the well-known animation character comprises animating images of the well-known animation character.

14. The method of claim 5, wherein the electronic message comprises a catch-phrase associated with the well-known animation character.

15. The method of claim 5, further comprising:
(vii) receiving a background-music identifier, via the server; and
(viii) outputting a background music according to the background-music identifier, via the server.

16. The method of claim 5, further comprising:
(vii) receiving a type of animation, via the server; and
wherein the step of generating moving images of the well-known animation character comprises generating moving images of the well-known animation character according to the type of animation.

17. A computer network system for communication, comprising:
(a) a first device having a processing unit and program code stored on a storage device of said first device, said, program code to perform a method when executed by said processing unit, said method, comprising:
(i) composing an electronic message;
(ii) selecting a well-known animation character;
(iii) transmitting the electronic message;
(iv) transmitting the well-known animation character;
(b) a server having a processing unit and program code stored on a storage device of said server, said program code to perform a method when executed by said processing unit, said method, comprising:
(i) receiving the electronic message;
(ii) receiving the well-known animation character;
(iii) converting the electronic message into speech using one of synthesized voice and actual voice of a voice impersonator of the well-known animation character;
(iv) generating moving images of the well-known animation character;
(v) transmitting the speech;
(vi) transmitting the moving images;
(c) a second device having a processing unit and program code stored on a storage device of said second device, said program code to perform a method when executed by said processing unit, said method, comprising
(i) receiving the speech;
(ii) receiving the moving images;
(iii) outputting the speech; and
(iv) displaying the moving images.

18. The computer network system of claim 17, wherein the electronic message is one of instant message, personal message, text message, e-mail, and voicemail.

19. The computer network system of claim 17, wherein the well-known animation character is one of human, animal, cartoon, and avatar.

20. The computer network system of claim 17, wherein the step of converting the electronic message into speech comprises utilizing pre-recorded speech of a voice impersonator of the well-known animation character.

* * * * *